Jan. 19, 1965     E. S. ROBERTS ETAL     3,166,390
METHOD OF MAKING HCNO
Filed April 4, 1960
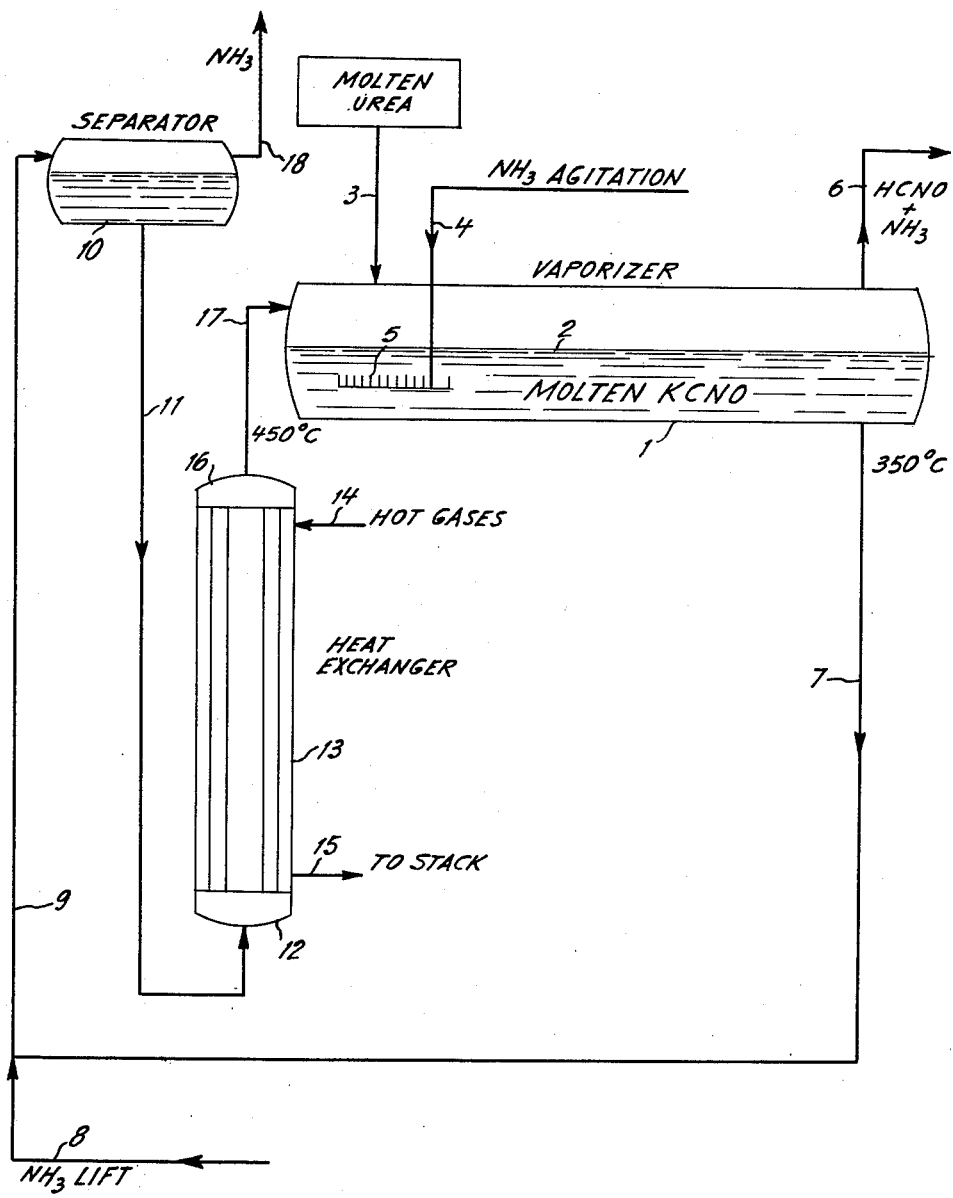
INVENTORS.
EDWARD S. ROBERTS
LUDWIG J. CHRISTMAN
BY
ATTORNEY United States Patent Office 3,166,390
Patented Jan. 19, 1965

3,166,390
METHOD OF MAKING HCNO
Edward S. Roberts, Ridgewood, and Ludwig J. Christmann, Bronxville, N.Y., assignors to Carbogen Corporation, Bronxville, N.Y., a corporation of New York
Filed Apr. 4, 1960, Ser. No. 19,921
8 Claims. (Cl. 23—151)

The present invention is directed to the production of cyanic acid (HCNO) from such substances as urea, biuret, cyanuric acid and related substances, and more particularly to a rapid and efficient method for the purpose.

In the prior art, the starting material was heated in direct contact with a heated surface whereby HCNO in the gaseous state was evolved. But side reactions occurred so that solid matter was formed and deposited on the heating surfaces, interfering with heat transfer. Such solid matter also coated particles of the starting materials, whereby the efficiency of the reaction was quite low and the cost of the operation became relatively high.

When urea, for example, is heated at atmospheric pressure, ammonia gas is evolved at temperatures above the melting point of the urea forming HCNO and biuret. Further heating transforms the biuret into more HCNO and ammonia which, in turn, depending on the temperature and pressure form cyanuric acid, ammelide and other triazines. When cyanuric acid is heated at atmospheric pressure, it begins to depolymerize at about 300° C. forming HCNO vapor. Cyamelide, upon heating, is largely first transformed into cyanuric acid. Ammelide, ammeline and other triazines which, upon heating, give off some gases and forming heat resisting solids, such as melam, melem, and melon.

The formation of HCNO from cyanuric acid, for example, requires the addition of about 31,000 Kcal. per kg. mol of HCNO calculated at 298° K. The formation of HCNO from molten urea requires about 36,120 Kcal. per kg. mol of HCNO. Upon increase of the temperature of the reaction, the heat requirement increases considerably. This explains why, in the prior art which used indirect heating such as through as container wall, then through incrustations of heat resistant decomposition products on the container wall, then through an adjacent gas film, the efficiency of the conversion to HCNO was low.

The present invention is intended and adapted to overcome the deficiencies and defects inherent in prior processes, it being among the objects of the invention to devise a process which is capable of transforming the nitrogen containing starting materials into HCNO vapor with high efficiency and at a rapid rate.

It is also among the objects of the invention to provide a process of producing HCNO by direct contact with the heating medium, which is adapted for continuous operation.

It is further among the objects of the invention to combine the production of HCNO with a further reaction of said HCNO with other substances, whereby a series of said reaction products are obtained in substantially a single operation.

The invention is based upon the conception that if the starting material could be distributed through a hot medium which had a degree of solubility for the starting materials, the transfer of the heat of the medium would be facilitated, the reaction would be rapid, HCNO would be quickly evolved, and the formation of side reaction products would be suppressed. The temperatures necessary for the reaction range from about 325° to 600° C., making it necessary to find a substance which is stable at these temperatures, non-reactive and non-volatile, and having some solubility for the nitrogenous starting materials.

It has been found that the alkali metal cyanates, and particularly KCNO, are quite suitable for the purpose. Where the higher temperatures are used as NaCNO is suitable, and mixtures of the two media have been found quite useful.

Thus urea, cyanuric acid, etc. when added to a melt of KCNO, evolve HCNO gas and, depending upon the rate of addition and the temperature of the melt, a steady stream of the gas is evolved at any desired rate. No appreciable build-up of solids occurs and no reaction takes place involving the KCNO. A circulating system may be used in which the KCNO is brought to a high temperature in a heated apparatus, is flowed into and through a reaction vessel where the starting material is introduced and transformed into HCNO which passes out of the reaction vessel. Thereby a continuous and substantially automatic operation is produced.

If some water were to be introduced accidently into the system, which would tend to react with the KCNO to form $K_2CO_3$, the urea present would reconvert it to KCNO. If some melam, melem or melon should be formed, they may be eliminated by the addition of $K_2CO_3$ to react with them and form more KCNO; or they may be eliminated by the addition of a little water vapor.

The melting point of KCNO is about 315° C. and the melt is very fluid at 350° C. and over, the viscosity being about that of water at room temperature. The heat capacity of molten KCNO is about 25 Kcal. per kg. mol per ° C. and its specific gravity is about 1.8 to 2.0. These favorable characteristics render this substance ideal for the present operation.

The invention is further illustrated in the accompanying drawing which is a diagrammatic view of an apparatus adapted for the practice of a continuous operation.

Reaction vessel or vaporizer 1 is filled partly with molten KCNO at a temperature of about 400° C. A stream of molten urea 3 is introduced at one end of vaporizer 1 at a predetermined rate. The mixture is agitated by a stream 4 of ammonia through a distributor 5 at the inlet end of the vaporizer. The exit gases, largely HCNO, are exited from the vaporizer through outlet 6 at the other end thereof. At the same end is a conduit 7 through which the KCNO flows. It is met by a stream 8 of $NH_3$ which acts as a lift, raising the KCNO through pipe 9 into separator 10. The KCNO flows by gravity through pipe 11 into the lower end 12 of heat exchanger 13, heated by hot gases 14 which enter the upper end of the heat exchanger and leave at 15 at the lower end. The reheated KCNO flows due to the head in separator 10 through the upper end 16 of the heat exchanger and through pipe 17 into the inlet end of vaporizer 1. The $NH_3$ released in the separator exists at 18. The HCNO formed may be recovered as such or may now be reacted with other substances.

Agitation may be by other inert gases than $NH_3$, such as $CO_2$, hydrogen, helium or the like. Mechanical agitation may be employed. The heat exchanger may be heated by means other than hot gases. Instead of circulating the KCNO, the reaction may take place in a vaporizer which is heated to the desired temperature, the heat being transferred to the KCNO which in turn transfers it to the reacting material. The vaporizer and heat exchanger may be of any suitable metal, and aluminum and titanium have been found satisfactory; the vaporizer and heat exchanger may be of steel coated with aluminum or titanium.

The vapors of HCNO at the temperature at which they are formed, may be reacted with other substances. For instance, the HCNO per se or mixed with $NH_3$ gas may be passed through a catalyst silica gel or a molecular sieve at the elevated temperature whereby melamine is formed according to the following equation:

$$6HCNO \rightarrow (H_2CN_2)_3 + 3CO_2$$

In prior practice, it was customary to pass urea or the like into a fluidized bed of a silica gel and adding the necessary heat across heat transfer surfaces to form HCNO and $NH_3$, which was wasteful. By the present method all of the heat is brought in the vapors of HCNO, thus eliminating the heat transfer surfaces and allowing a fixed bed to be used. Thus a unitary two-step process is inherent in the present invention.

Melamine may be produced by means of the apparatus shown in the drawing as the first step in the operation. To exit gases 6 consisting of HCNO and $NH_3$ at about 350° C. is added sufficient $NH_3$ so that the mixture contains 10 to 20 mols. of $NH_3$ for each mol. of HCNO, and the mixture is passed through the bed of molecular sieves. The vapors of melamine leaving the molecular sieve is cooled to condense it. The $CO_2$ formed in the reaction is removed from the gas stream after the removal of the melamine, in the form of ammonium carbamate, by further cooling the gas mixture to room temperature. The residual $NH_3$ in the effluent gases may be recycled. The production of HCNO from urea gives one mol. of $NH_3$ per mol. of HCNO, and thus 6 mols. of $NH_3$ per mol. of melamine, which is the correct 2:1 ratio with the $CO_2$ produced in the melamine synthesis to give ammonium carbamate.

Other reactions involving the vaporous HCNO include the reactions with alcohols, both mono and poly, to form carbamates according to the following equation:

$$ROH + HCNO \rightarrow ROCONH_2$$

wherein R is a hydrocarbon radical, either alkyl or aryl, and having any desired number of carbon atoms up to 22.

If such a carbamate is reacted with additional HCNO, an allophanate is obtained:

$$ROCONH_2 + HCNO \rightarrow ROCONHCONH_2$$

When the HCNO is reacted with primary or secondary amines, substituted ureas are formed in accordance with the following equations:

$$RNH_2 + HCNO \rightarrow RNHCONH_2$$
$$RRNH_2 + HCNO \rightarrow RRNCONH_2$$

A hot mixture of HCNO and $NH_3$ in equamolecular amounts produced from urea according to this invention is mixed with phosgene gas; the following reaction takes place:

$$HCNO + NH_3 + COCl_2 \rightarrow 2NH_2COCl$$

to form carbamyl chloride.

When cyanuric acid is vaporized to HCNO vapor alone, this vapor stream may be reacted with anhydrous HCl gas to give carbamyl chloride as follows:

$$HCNO + HCl = NH_2COCl$$

What is claimed is:
1. A method of producing HCNO in the vapor form which comprises providing a melt of a salt of cyanic acid at a temperature substantially above about 325° C., introducing into said melt a substance taken from the class consisting of urea, biuret, cyanuric acid, said salt being liquid at about 325° C. and having solubility for said substances, removing the gaseous products formed, and recovering HCNO from said products.
2. A method according to claim 1 characterized in that the temperature is between about 325° and 600° C.
3. A method according to claim 1 characterized in that said salt is an alkali metal salt.
4. A method according to claim 1 characterized in that said salt is potassium cyanate.
5. A method according to claim 1 characterized in that said salt is a mixture of sodium and potassium cyanate.
6. A method according to claim 1 characterized in that the cyanic acid salt is circulated from the reaction, then reheated and returned to the reaction.
7. A method according to claim 1 characterized in that the melt is agitated by an inert gas.
8. A method according to claim 1 characterized in that the melt is agitated mechanically.

References Cited in the file of this patent

UNITED STATES PATENTS

| | | |
|---|---|---|
| 1,144,457 | Beindl | June 29, 1915 |
| 2,480,088 | Slocombe et al. | Aug. 23, 1941 |
| 2,447,372 | Slocombe et al. | Aug. 17, 1948 |
| 2,549,492 | Lee | Apr. 17, 1951 |
| 2,550,659 | Vingee | Apr. 24, 1951 |
| 2,689,866 | Spielman et al. | Sept. 21, 1954 |
| 2,697,720 | Kaiser | Dec. 21, 1954 |
| 2,722,550 | Schollenberger | Nov. 1, 1955 |
| 2,729,677 | Gilbert et al. | Jan. 3, 1956 |
| 2,957,751 | Vancheri et al. | Oct. 25, 1960 |

OTHER REFERENCES

Williams: "Cyanogen Compounds," Edward Arnold and Co., London, 2nd ed., 1948, pages 67 and 71.

Williams: "Cyanogen Compounds," Edward Arnold and Co., London, 2nd ed., 1948, pages 49, 72, and 73.

Serial No. 292,742, Beck et al. (A.P.C.), published July 13, 1943 (abandoned).